US007448615B2

(12) United States Patent
Takamura

(10) Patent No.: US 7,448,615 B2
(45) Date of Patent: Nov. 11, 2008

(54) SHEET PROCESSING APPARATUS FEATURING RELATIVELY-DISPLACED STAPLED SHEET BUNDLES AND RELATED METHOD

(75) Inventor: Mitsuhide Takamura, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 10/688,389

(22) Filed: Oct. 20, 2003

(65) Prior Publication Data

US 2004/0084827 A1 May 6, 2004

(30) Foreign Application Priority Data

Oct. 23, 2002 (JP) ............................ 2002-308371

(51) Int. Cl.
*B65H 43/00* (2006.01)
*B65H 33/04* (2006.01)
*B65H 39/00* (2006.01)
*H04N 1/21* (2006.01)
*H04N 1/23* (2006.01)
*G03G 15/00* (2006.01)

(52) U.S. Cl. .................... 271/176; 270/58.11; 358/296; 399/404

(58) Field of Classification Search .............. 270/58.08, 270/58.09, 58.11, 58.12, 50.09; 271/176, 271/207, 218; 414/790.9, 791.1, 790.2; 358/296; 399/404
See application file for complete search history.

(56) References Cited

U.S. PATENT DOCUMENTS 4,905,979 A * 3/1990 Limbach et al. ............. 271/176
5,007,625 A * 4/1991 Kremers et al. .......... 270/58.01
5,098,074 A * 3/1992 Mandel et al. ........... 270/58.13
5,128,762 A * 7/1992 Muramatsu et al. ......... 358/296
5,289,251 A * 2/1994 Mandel et al. .............. 399/407
5,318,401 A * 6/1994 Mandel ................... 414/792.7
5,342,165 A * 8/1994 Graef et al. ............ 414/788.09
5,447,297 A 9/1995 Murata et al. ................. 270/53
5,447,298 A * 9/1995 Watanabe et al. ........ 270/58.11
5,618,035 A * 4/1997 Coombs et al. ............. 271/213
5,848,325 A * 12/1998 Matsumura .................. 399/83
6,227,531 B1 * 5/2001 Guerrero et al. ......... 270/58.31
6,231,039 B1 * 5/2001 Chung ..................... 270/58.01

(Continued)

FOREIGN PATENT DOCUMENTS

JP 8-259073 10/1996

(Continued)

*Primary Examiner*—Gene Crawford
*Assistant Examiner*—Rakesh Kumar
(74) *Attorney, Agent, or Firm*—Fitzpatrick, Cella, Harper & Scinto

(57) ABSTRACT

A sheet processing apparatus includes a sheet conveyor for conveying sheets; a first loader for loading a sheet bundle including a plurality of sheets conveyed by the sheet conveyor; a lateral aligner for aligning opposite side edges of the sheet bundle loaded on the first loader in a direction perpendicular to a sheet conveying direction; a stapler for performing a stapling treatment with respect to a sheet bundle aligned by the lateral aligner; a sheet bundle conveyor for conveying a sheet bundle stapled by the stapler; a second loader for loading sheet bundles conveyed by the sheet bundle conveyor; and loading position controller for loading sheet bundles to be loaded onto the second loader so that the loading positions thereof are displaced from each other along the sheet conveying direction.

11 Claims, 19 Drawing Sheets

U.S. PATENT DOCUMENTS

| | | | | |
|---|---|---|---|---|
| 6,260,837 | B1 * | 7/2001 | Nanba et al. | 270/58.08 |
| 6,357,743 | B1 * | 3/2002 | Endo et al. | 271/296 |
| 6,371,472 | B1 * | 4/2002 | Miyake et al. | 270/58.14 |
| 6,382,614 | B1 * | 5/2002 | Fukatsu et al. | 270/58.11 |
| 6,473,590 | B2 * | 10/2002 | Matsumoto et al. | 399/404 |
| 6,533,265 | B1 * | 3/2003 | Baldini | 271/207 |
| 6,581,922 | B2 * | 6/2003 | Kuwata et al. | 270/58.11 |
| 6,612,560 | B2 * | 9/2003 | Sanders | 270/58.12 |
| 6,659,455 | B2 * | 12/2003 | Endo et al. | 271/220 |
| 6,674,976 | B2 * | 1/2004 | Sato et al. | 399/18 |
| 6,722,650 | B1 * | 4/2004 | Abbata et al. | 271/213 |
| 6,819,906 | B1 * | 11/2004 | Herrmann et al. | 399/368 |
| 6,942,206 | B2 * | 9/2005 | Kuwata et al. | 270/58.08 |
| 6,963,722 | B2 * | 11/2005 | Matsumoto et al. | 399/404 |
| 2003/0094745 | A1 * | 5/2003 | Kitahara | 270/58.08 |

FOREIGN PATENT DOCUMENTS

| | | |
|---|---|---|
| JP | 2000-95420 | 4/2000 |
| JP | 2000-143055 | 5/2000 |

* cited by examiner

SHEET PROCESSING APPARATUS FEATURING RELATIVELY-DISPLACED STAPLED SHEET BUNDLES AND RELATED METHOD

BACKGROUND OF THE INVENTION

1. Field of the Invention

The present invention relates to sheet conveying control and loading processing in a sheet processing apparatus to be connected to an image forming apparatus.

2. Description of the Related Art

Hitherto, some image forming apparatuses, such as printers, have been equipped with a sheet processing apparatus that aligns end portions of a sheet bundle comprising a plurality of sheets with images formed thereon (or printed sheets) and that performs post-processing such as stapling (i.e., needle driving) before discharging the sheet bundle.

Such a sheet processing apparatus has had an arrangement wherein sheets are conveyed onto a stack tray used for performing stapling, wherein, after a predetermined number of sheets have been conveyed to thereby form a sheet bundle, the sheet bundle is stapled, and wherein the stapled sheet bundle is discharged onto a paper discharge tray by driving paper discharge rollers.

In the sheet processing apparatus with such features, since the stapling portion of each of the sheet bundles protrudes, when large numbers of sheet bundles are discharged onto a paper discharge tray, stapling portions formed for each sheet bundles are superimposed one on another, thereby forming a protuberance at a local part of the sheets loaded on the paper discharge tray. This protuberance unfavorably causes the sheet processing apparatus to erroneously detect a full load, i.e., the upper limit of loading of sheet bundles, although more sheet bundles can be loaded onto the paper discharge tray.

Accordingly, Japanese Patent Laid-Open No. 2000-95420 discloses an invention that prevents such a local protuberance in sheets loaded on a paper discharge tray by discharging sheet bundles so that staple portions thereof are not superimposed on each other.

However, in the invention set forth in the Japanese Patent Laid-Open No. 2000-95420, the arrangement is such that stapling is performed with respect to sheet bundles loaded on upper trays, that the upper trays are moved by a predetermined distance along the direction perpendicular to the sheet bundle discharge direction, and that sheet bundle is let to fall from the upper trays onto a lower tray, thereby performing loading in a manner such that the stapling positions of sheet bundles loaded on the lower tray are displaced from each other. Therefore, in this arrangement, it has not been possible to discharge paper in a state where the stapling positions of sheet bundles are displaced from each other along the sheet bundle discharge direction, although it has been possible to discharge paper in a state where the stapling positions of sheet bundles are displaced from each other along the direction perpendicular to the sheet bundle discharge direction.

SUMMARY OF THE INVENTION

Accordingly, it is an object of the present invention to provide a sheet processing apparatus that, when discharging stabled sheet bundles, prevents premature full load detection on a paper discharge tray, by loading the sheet bundles on the paper discharge tray in a manner such that the stapling positions thereof are displaced from each other along the sheet bundle discharge direction.

The present invention provides a sheet processing apparatus that includes sheet conveying means for conveying sheets; first loading means for loading a sheet bundle comprising a plurality of sheets conveyed by the sheet conveying means; lateral aligning means for aligning the opposite side edges of the sheet bundle loaded on the first loading means in the direction perpendicular to the sheet conveying direction; stapling means for performing a stapling treatment with respect to a sheet bundle aligned by the lateral alignment means; sheet bundle conveying means for conveying a sheet bundle stapled by the stapling means; second loading means for loading sheet bundles conveyed by the sheet bundle conveying means; and loading position control means for loading sheet bundles to be loaded onto the second loading means so that the loading positions thereof are displaced from each other along the sheet conveying direction.

Further objects, features and advantages of the present invention will become apparent from the following description of the preferred embodiments with reference to the attached drawings.

DESCRIPTION OF THE PREFERRED EMBODIMENTS

Hereinafter, embodiments of the present invention will be described with reference to the accompanying drawings. In the descriptions of various embodiments shown below, a sheet processing apparatus to be mounted to a printer apparatus represented by a laser beam printer, is taken as an example.

Figure 1A:
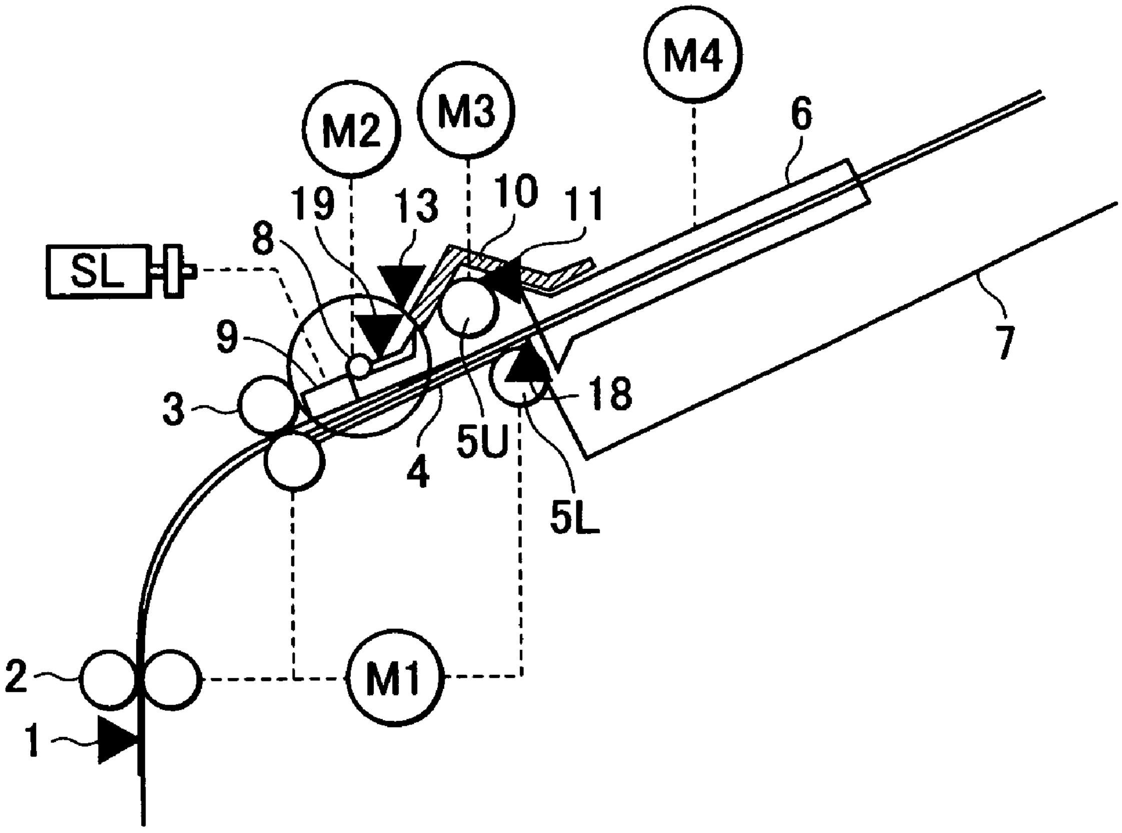
FIGS. 1A and 1B are schematic sectional views of the conveying path of a sheet processing apparatus according to the present invention.
Figure 1B:
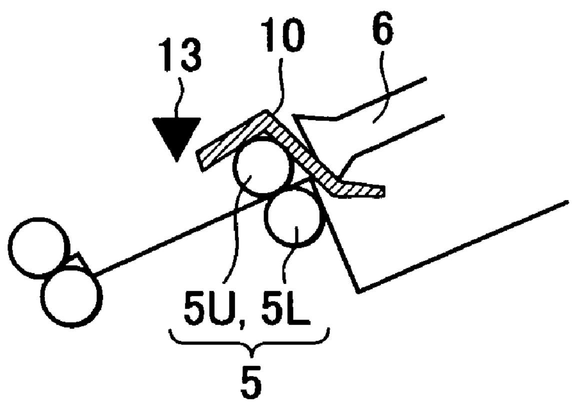

FIGS. 1A and 1B are schematic sectional views of the conveying path of a sheet processing apparatus according to an embodiment of the present invention. In FIG. 1A, a sheet conveyed from an image forming apparatus (not shown) is detected at an inlet sensor 1, and is conveyed by conveying rollers 2. Then, the sheet is conveyed onto a first tray 4 by intermediate rollers 3.

A plurality of sheets conveyed onto the first tray 4 forms a sheet bundle. This sheet bundle is discharged from the first tray 4 onto a second tray 7 by a pair of bundle discharge rollers 5 comprising a bundle discharge upper roller 5U and a bundle discharge lower roller 5L, and capable of being switched between separation and nipping.

The conveying rollers 2, intermediate rollers 3, and bundle discharge rollers 5 are rotationally driven by a conveying motor M1. The nipping position and separation position of the bundle discharge rollers 5 are positioned by a cam driven by a separation motor M3. A position sensor flag is connected to this cam. The position where the flag shields, from light, a bundle discharge roller HP (Home Position) sensor 11 serving a photosensor, corresponds to the separation position, while the position where the flag allows light to pass through a bundle discharge roller HP sensor 11 corresponds to the nipping position.

Lateral alignment members 6 perform alignment operation in the lateral direction, i.e., in the direction perpendicular to the sheet conveying direction, with respect to a sheet bundle loaded on the first tray 4. The lateral alignment members 6 are driven by a lateral alignment motor M4 (stepping motor). Detailed operations of the lateral alignment members 6 will be described later.

A longitudinal alignment member 8 is a paddle for pulling back sheets that have run off the first tray 4, and it performs alignment operation in the longitudinal direction, i.e., in the sheet conveying direction, with respect to a sheet bundle loaded on the first tray 4. The longitudinal alignment member 8 is rotated by a longitudinal alignment motor M2. The longitudinal alignment member 8 is configured to have a longitudinal alignment member HP sensor 19, which is used for rotational control of the longitudinal alignment motor M2.

A sheet hold-down member 9 is provided for holding down a sheet bundle aligned on the first tray 4, and is configured to separate from the sheet bundle when a plunger-type solenoid SL is turned on, and to depress the sheet bundle when the solenoid SL is turned off.

A sheet bundle presence detecting sensor 18 is used for determining whether discharging and loading of sheet bundles have been properly performed on the first tray A full load detecting sensor flag 10 is located on the bundle discharge upper roller 5U. As further shown in FIG. 1B, with the bundle discharge rollers 5 nipped, when sheets on the second tray 7 attain the height level at full load, the full load detecting sensor flag 10 allows light to pass through a full load detecting sensor 13. When the bundle discharge rollers 5 are separated, the full load detecting sensor flag 10 is retreated to an upper portion, and therefore, it is in the state where it must not make full load detection.

Figure 2:
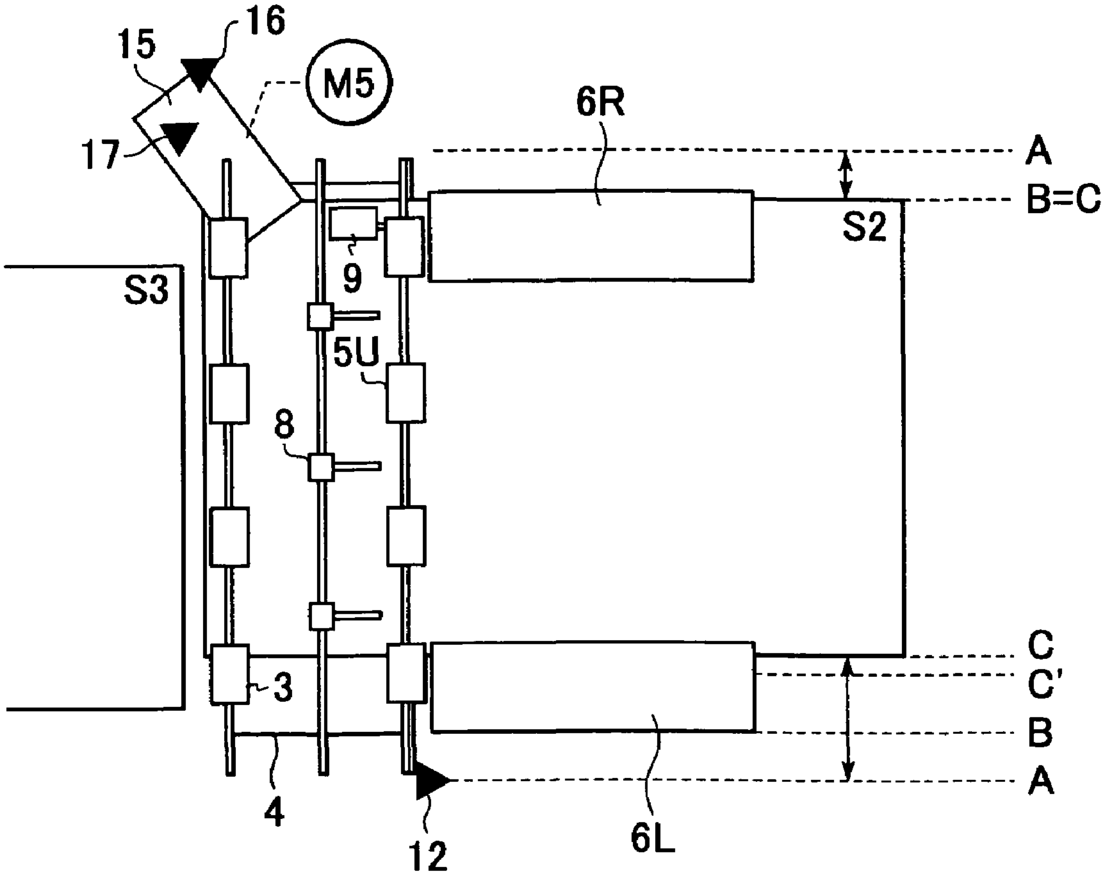
FIG. 2 is a schematic plan view of the alignment processing section of the sheet processing apparatus.

FIG. 2 is a schematic plan view of an alignment processing section of the present sheet processing apparatus. As shown in FIG. 2, a pair of lateral alignment members 6 comprise a left lateral alignment member 6L that holds down the left side of a sheet bundle, and a right lateral alignment member 6R that holds down the right side of the sheet bundle. Each of the left and right lateral alignment members 6L and 6R moves to either of a retreat position A, standby position B, alignment position C, and lateral alignment release position C'. A lateral alignment member HP sensor 12 for detecting the retreat position is provided to the retreat position A. The right lateral alignment member 6R is configured so as not to move inside the standby position thereof B, and the alignment operation is performed only by the left lateral alignment member 6L in keeping with a sheet size.

A stapler 15 performs needle driving at a corner of a sheet bundle aligned on the first tray 4, by driving a staple motor M5. The stapler 15 includes a stapler HP sensor 16 for detecting an initial position and a needle presence detecting sensor 17 for performing detection for needle absence notice.

Figure 3:
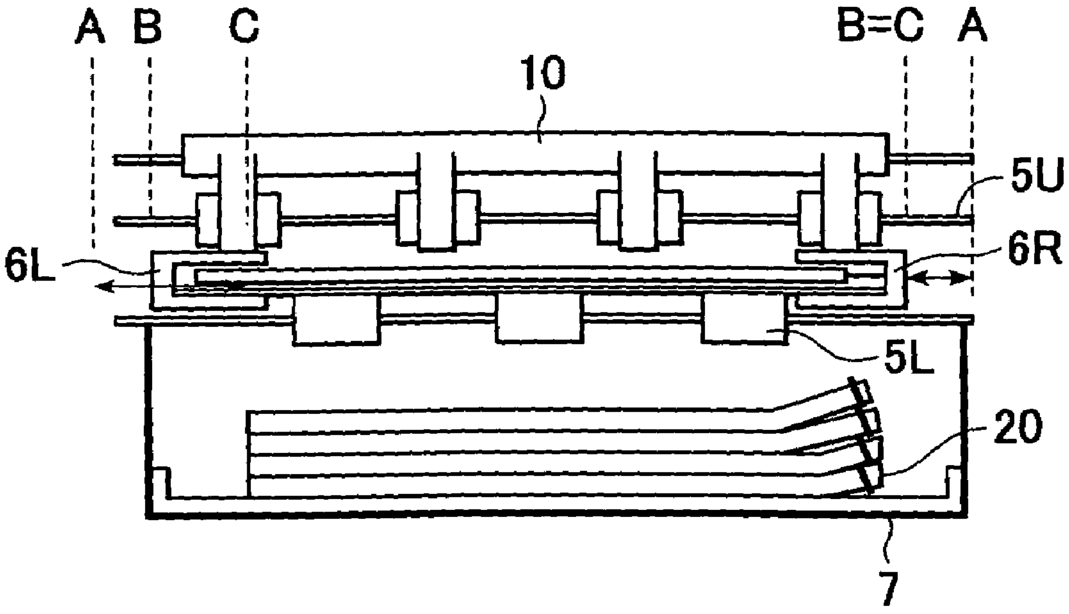
FIG. 3 is a schematic sectional view of the alignment processing section as viewed from the direction of the paper discharge port of the sheet processing apparatus.

FIG. 3 is a schematic sectional view of the alignment processing section as viewed from the direction of a paper discharge port of the present sheet processing apparatus. Besides at the central portion of a sheet bundle, full load detecting sensor flags 10 are provided at both ends of the sheet bundle so as to properly detect a protuberance at stapling position thereof. This causes the operational range of the lateral alignment members 6 and that of the full load detecting sensor flags 10 to interfere with each other.

As shown in FIG. 3, a plurality of sheet bundles loaded on the second tray 7 is protruded only on one side thereof by staple needles 20. Such a state occurs when sheet bundles are loaded so that stapling positions thereof are superimposed on one another. In this case, there is possibility that a full load be prematurely detected by the full load detecting sensor flags 10.

Figure 4:
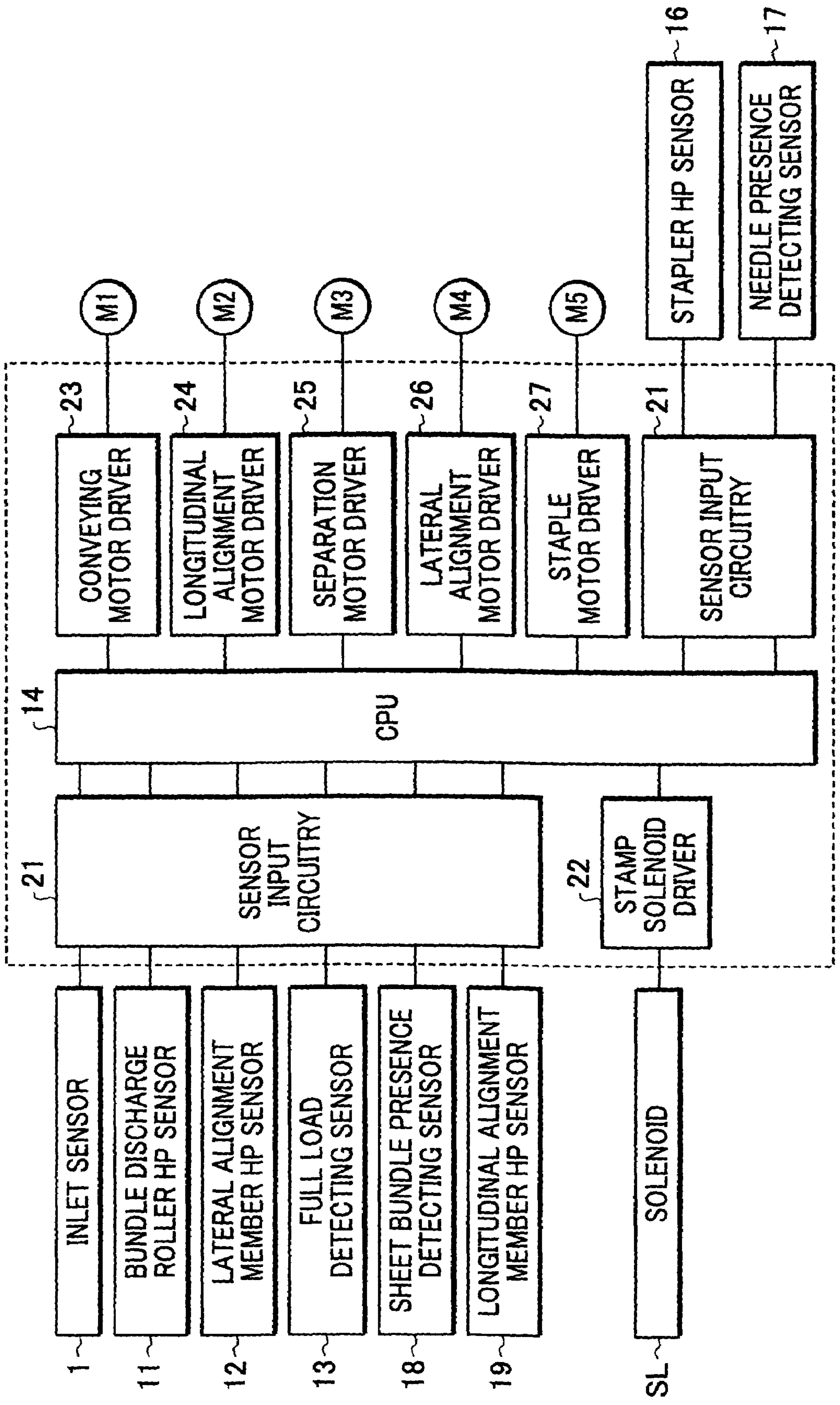
FIG. 4 is a block diagram of the sheet processing apparatus.

FIG. 4 is a block diagram of the present sheet processing apparatus. A CPU 14 performs control of the sheet processing apparatus according to the present embodiment. The CPU 14 is connected to the inlet sensor 1, bundle discharge roller HP sensor 11, lateral alignment member HP sensor 12, full load detecting sensor 13, sheet bundle presence detecting sensor 18, longitudinal alignment member HP sensor 19, stapler HP sensor 16, and needle presence detecting sensor 17 through the intermediary of the sensor input circuitry 21.

The CPU 14 is also connected to a solenoid SL through a stamp solenoid driver 22.

Furthermore, the CPU 14 is connected to the conveying motor M1, longitudinal alignment motor M2, separation motor M3, lateral alignment motor M4, and staple motor M5, respectively through the conveying motor driver 23, longitudinal alignment motor driver 24, separation motor driver 25, lateral alignment motor driver 26, and staple motor driver 27.

Hereinafter, descriptions will be made as to how the CPU 14 performs control using the above-described various mechanisms.

(1) Initialization Processing

Figure 5:
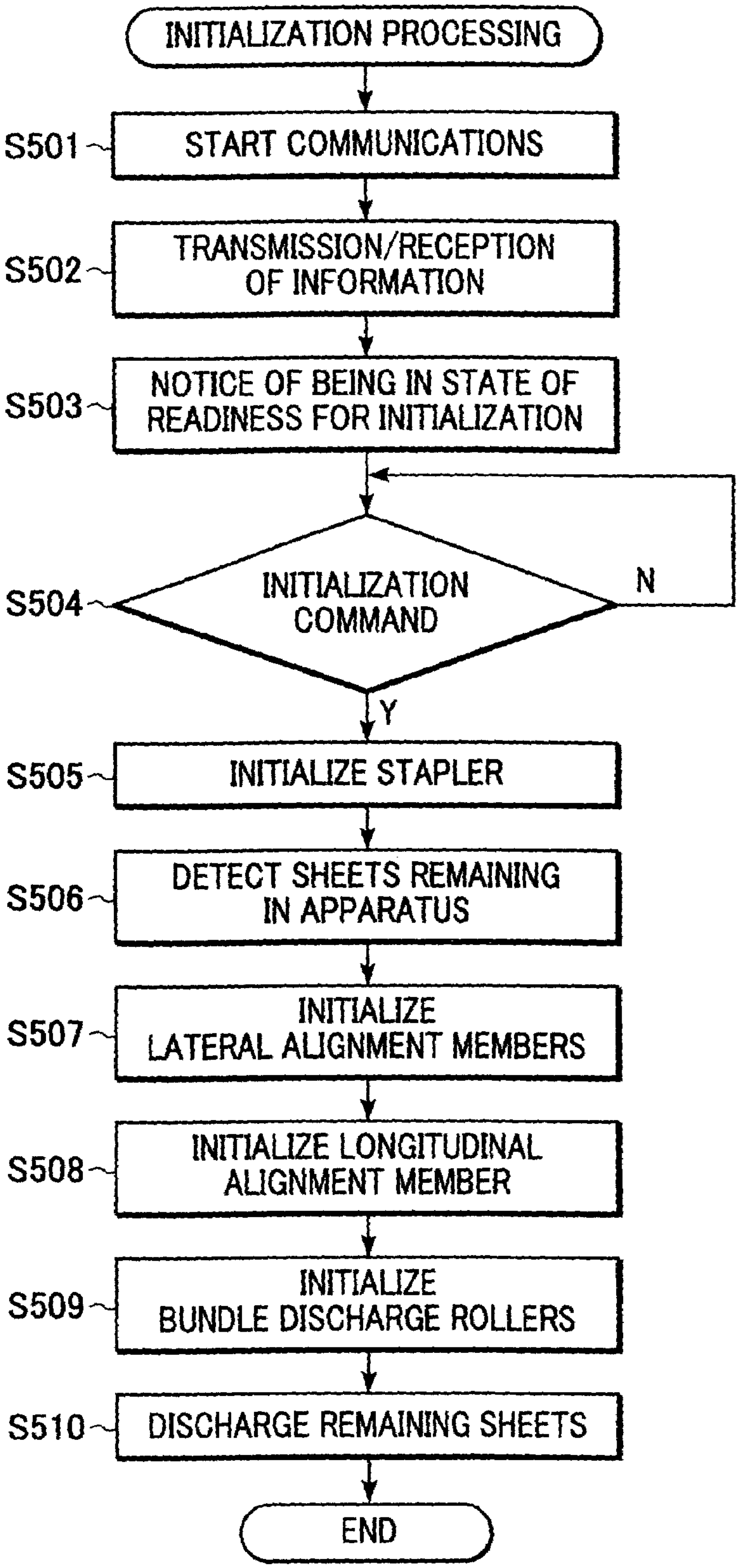
FIG. 5 is a flowchart showing the initialization processing in the sheet processing apparatus.

FIG. 5 is a flowchart showing the initialization processing in the present sheet processing apparatus. Upon powering-on, the CPU 14 starts communications with a printer controller, which is not shown (step S501). With the communications started, the printer controller and the CPU 14 transmits/receives mutual apparatus information (step S502).

Next, the CPU 14 notifies the printer controller of being in a state of readiness for initialization (step S503), and waits for an initialization command from the printer controller (step S504). The initialization operations in a printer system including the sheet processing apparatus comprise the detection and discharge of remaining sheets in an image forming apparatus, and therefore, if an initialization operation is performed in the sheet processing apparatus alone, the remaining sheets could suffer damage. Accordingly, the printer controller is arranged to also communicate with a printer engine controller (not shown) and issue an initialization command to each of all devices of the entire system when they come into states of readiness for initialization.

Upon receipt of the initialization command from the printer controller, the stapler is initialized (step S505). Thereafter, detection processing of remaining sheets in the apparatus (step S506), initialization processing of the lateral alignment members 6 (step S507), initialization processing of the longitudinal alignment member 8 (step S508), and initialization processing of the bundle discharge rollers 5 (step S509) are performed.

Then, paper discharge processing of remaining sheets on the first tray 4 is performed (step S510). Here, it is important that the initialization processing of the lateral alignment members 6 should be performed prior to that of the bundle discharge rollers 5. Given that the bundle discharge rollers 5 are in a nipped state and the lateral alignment members 6 are located in respective retreat positions A, if a user erroneously pushes the lateral alignment members 6 in the central direction, the full load detecting sensor flags 10 would assume a position in a manner such that it crawls under the lateral alignment members 6.

Under this situation, if the initialization of the bundle discharge rollers 5 in step S509 is performed prior to that of the lateral alignment members 6, the full load detecting sensor flags 10 and the lateral alignment members 6 mutually interfere, thereby unfavorably causing a failure. This is the reason why the initialization processing of the lateral alignment members 6 must be performed prior to that of the bundle discharge rollers 5.

(2) Sheet Conveyance Management Processing

Reference will now be made to the sheet conveyance management processing in which sheets are conveyed from an image forming apparatus to the sheet processing apparatus according to the present invention, and in which the sheet processing apparatus performs processing operations.

Figure 6:
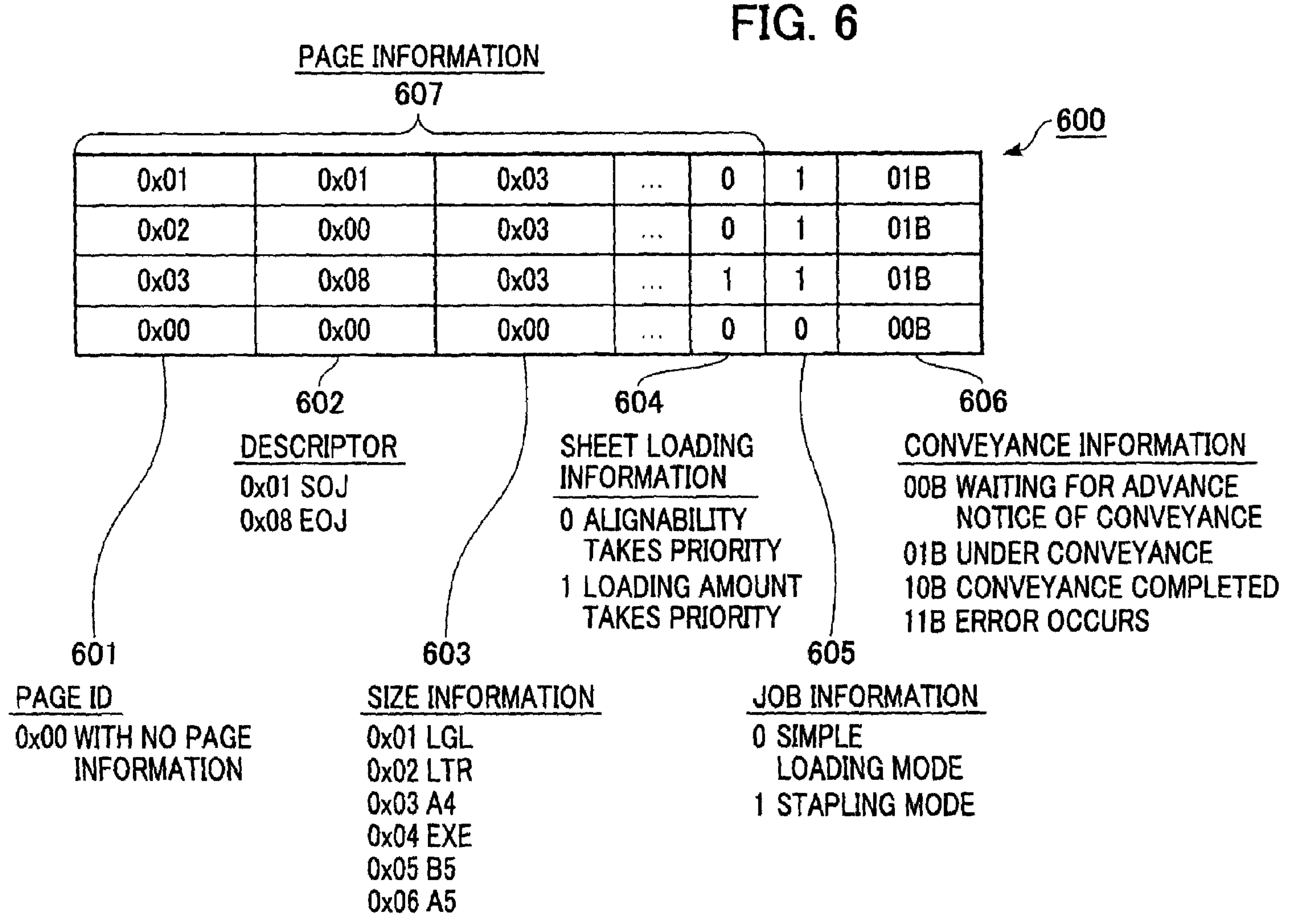
FIG. 6 is a representation of the conveyance management table in the sheet processing apparatus.

FIG. 6 is a representation of a conveyance management table 600. Before sheets are conveyed from the image forming apparatus, page information 607 and job information 605 are sent from the printer controller to the CPU 14 by a communication link or links. As shown in FIG. 6, the CPU stores the received page information 607 and job information 605 in the conveyance management table 600. Here, the conveyance management table 600 is a ring buffer that can register four pages of information.

The page information 607 comprises a page ID 601, descriptor 602, size information 603, and sheet loading information 604. The page ID 601 is a specific number given to each individual page. The descriptor 602 is information showing the positioning of a sheet in a job. Information "SOJ" (Start of JOB) is added on the top page in a job, and information "EOJ" (End of Job) is added on the last page in the job. The size information 603 is information showing the size of a sheet.

The sheet loading information 604 is set to data specifying the alignability priority, or data specifying the loading amount priority, when loading sheets after having stapled the sheets.

In the case where the alignability priority is selected, when loading a sheet bundle on the second tray 7, it is loaded in the same position as that of other sheet bundles. In this case, although the sheet bundles are loaded in an aligned state on the second tray 7, stapling positions thereof are superimposed on each other, thereby causing premature full load detection.

On the other hand, in the case where the loading amount priority is selected, when discharging and loading a sheet bundle with respect to the second tray 7, it is loaded thereon in a state where its stapling position is displaced from the staple positions of other sheet bundles along the sheet bundle conveying direction. More details in this respect will be given later. In this case, although premature full load detection caused by the occurrence of a protuberance in stapling positions can be prevented, the loading in an aligned state cannot be achieved.

The job information 605 is set to a simple loading mode, in which no stapling operation is performed, or to a stapling mode, in which a stapling operation is performed.

The conveyance information 606 denotes that an advance notice of conveyance has not yet been received when it is 00B, and denotes that a conveying operation is being performed when it is 01B. Also, the conveyance information 606 denotes that a conveyance has been completed when it is 10B, and denotes the an error has been occurred during conveyance when it is 11B.

In FIG. 6, the conveyance management table 600 shows that the sheet of which the page ID corresponds to size 0×03 is the last page of a sheet bundle to be stapled, and that the sheet bundle is to be loaded in the loading amount priority mode when it is discharged to and loaded onto the second tray 7 after having been conveyed and stapled. Specifically, sheet bundles are loaded so that the stapling positions of the sheet bundles loaded on the second tray 7 are displaced from one another along the sheet bundle conveying direction.

Upon receipt of the job information 605 and the page information 607 shown in FIG. 6 from the printer controller, the CPU stores the information, and transmits a necessary inter-paper interval (i.e., time interval between paper sheets) to the printer controller. The necessary inter-paper interval is usually 0 second, but when a stapling treatment is performed, a predetermined stapling operation time must be provided. Upon receiving of the information on the necessary inter-paper interval, the printer controller provides the inter-paper interval, which is an conveyance time interval between sheets, by delaying the start of printing with respect to a pertinent page by the designated time interval.

Figure 7:
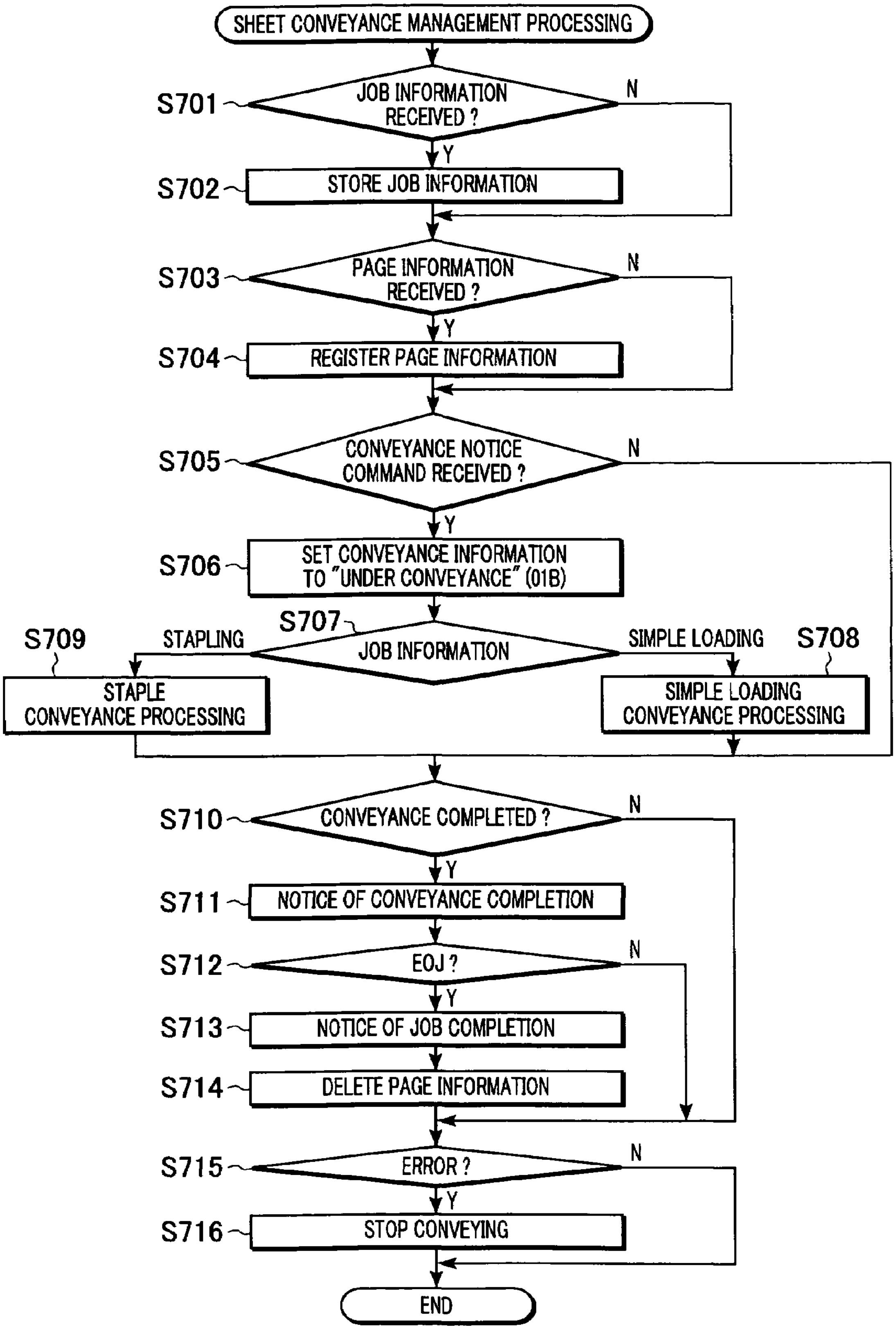
FIG. 7 is a flowchart showing sheet conveyance management processing in the sheet processing apparatus.

FIG. 7 is a flowchart showing sheet conveyance management processing. First, it is determined whether job information 605 has been received (step S701), and if so, it is stored (step S702). Here, all job information 605 to be stored is stored as the simple loading mode. This is because, in the initialization processing of the above-described devices, i.e., the stapler 15, lateral alignment members 6, longitudinal alignment member 8, and bundle discharge rollers 5, if failures of all of these devices are detected, stapling processing cannot be performed with respect to sheets conveyed from the image forming apparatus.

Next, it is determined whether page information 607 has been received (step S703), and if so, the information is additionally registered in the conveyance management table (step S704). As shown in FIG. 6, besides the page information 607 received from the printer controller, 1 bit of job information 605 stored in step S702, and 2 bits of conveyance information 606 are added in the conveyance management table 600.

Next, it is determined whether a conveyance notice command has been received (step S705), and if so, the conveyance information that was registered the earliest is retrieved, and that information is set to 01B (step S706).

Then, the job information 605 of pertinent page information 607 is checked (step S707), and if it is the simple loading mode, simple loading conveyance processing is performed (step S708). In step S707, if the job information 605 is the stapling mode, staple conveyance processing is performed (step S709). In the above-described processing, addresses of the page information 607 are delivered, and conveyance processing is performed based on this page information 607. A more detailed description of staple conveyance processing will be given later with reference to FIG. 8.

It is now determined whether the conveyance has been completed (step S710). Specifically, the conveyance management table 600 is searched to pick up a piece of conveyance information 606 that is 10B. When the piece of information 606 that is 10B is found therein, the notification of conveyance completion is provided to the printer controller together with a corresponding page ID (step S711).

After the notification of conveyance completion in step S711, the descriptor 602 in the pertinent page information 607 is checked, and it is determined whether "EOJ" has been added therein (step S712). If so, the notification of job completion is provided to the printer controller (step S713). Then, the page information concerning the completed job is deleted from the conveyance management table 600 (step S714). Thereafter, the processing advances to step S715.

Even if it is determined in step S710 that the conveyance has been not yet been completed, or even if it is determined in step S712 that the descriptor does not correspond to "EOJ", the processing advances to step S715.

Next, it is determined whether an error has occurred during conveyance (step S715). Specifically, the conveyance management table 600 is searched to pick up a piece of conveyance information 606 that is 11B. Conveyance information 11B denotes the occurrence of an error. If a piece of information 606 that is 11B is found therein, conveyance stoppage processing is performed (step S716).

In the conveyance stoppage processing in step S716, the stoppage/deletion of the entire conveyance processing, the stoppage of all driving systems such as motors, the notification of the error information to the printer controller, and the deletion of conveyance information are executed.

The above-described processing from steps S701 to S716 is perpetually continued.

(3) Staple Conveyance Processing

Figure 8:
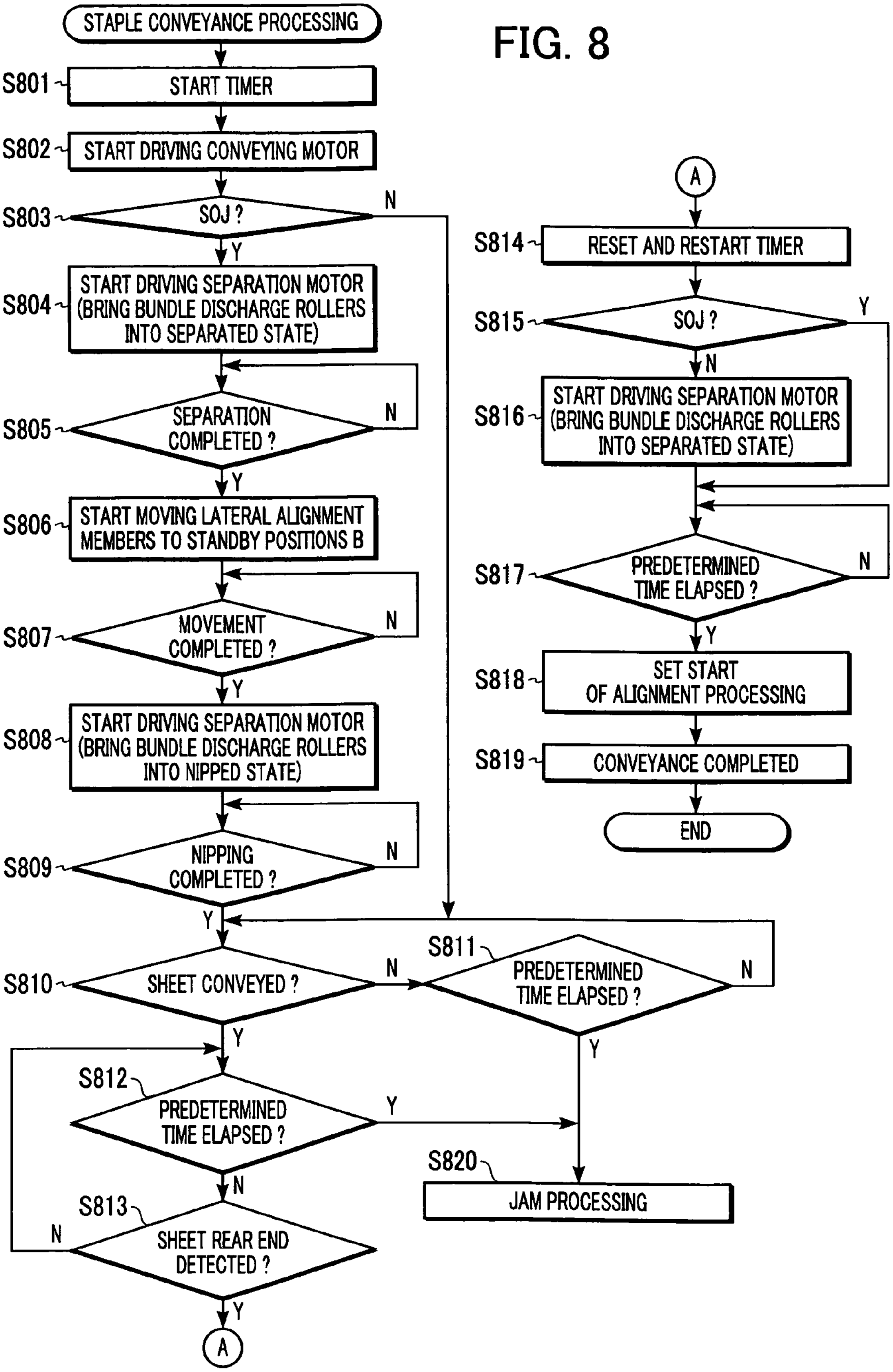
FIG. 8 is a flowchart showing staple conveyance management processing in the sheet processing apparatus.

FIG. 8 is a flowchart showing staple conveyance processing. First, a timer is started (S801), and the driving of the conveying motor M1 is started (step S802). Then, the descriptor 602 in the page information 607 is referred to, and it is determined whether the descriptor 602 corresponds to "SOJ" (step S803). If so, this means that a pertinent page is the top page in a job, and therefore, the processing from step S804 described below is performed. If the descriptor 602 does not correspond to "SOJ", processing is performed from step S810.

In step S803, if it is determined that descriptor 602 corresponds to "SOJ", the separation motor M3 is driven to separate the bundle discharge rollers 5 that has been nipped by the initialization processing (step S804). Then, the processing waits until the separation operation is completed (step S805).

Next, the lateral alignment motor M4 is driven to move the lateral alignment members 6 up to the respective standby positions B (step S806), and the processing waits until the movement of the lateral alignment members 6 is completed (step S807). The reason why the bundle discharge rollers 5 are once separated is that, if the lateral alignment members 6 are moved up to the respective standby positions B without separating the bundle discharge rollers 5, the full load detecting sensor flags 10 being moved to the retreat positions by the bundle discharge upper roller 5U are held down by the lateral alignment members 6, thereby hindering the sheet conveyance.

Then, in order to again nip the separated bundle discharge rollers 5, the separation motor M3 is driven (step S808), and the processing waits until the nipping operation is completed (step S809).

When the nipping of the bundle discharge rollers 5 is completed, the inlet sensor 1 is checked, and it is determined whether a sheet has been conveyed to the sheet processing apparatus (step S810). Otherwise, the timer value is checked and it is determined whether a determined time has elapsed (step S811). If the determined time has elapsed, it is determined that a delay jam has occurred, and jam processing is performed (step S820). Otherwise, the processing returns to step S810.

In step S810, if the inlet sensor 1 detects a sheet, the timer value is checked and it is determined whether a predetermined time that had been set for each sheet size has elapsed (step S812). If so, it is determined that a hold-up jam has occurred, and jam processing is performed (step S820).

In step S812, if the predetermined time has not yet elapsed, the inlet sensor 1 is checked and it is determined whether the rear end of the sheet has been detected (step S813). Otherwise, the processing returns to step S812.

In step S813, if the rear end of the sheet is detected, the timer counter is reset and is caused to newly count (step S814). Thereafter, the descriptor 602 in the page information 607 is referred to, and it is determined whether the descriptor 602 corresponds to "SOJ" (step S815). Otherwise, the separation motor M3 is driven to separate the bundle discharge rollers 5 (step S816).

In the staple conveyance processing, sheets are loaded onto the first tray 4 one after another and these sheets are subjected to an alignment operation. However, if the bundle discharge rollers 5 are nipped, the sheets are unfavorably discharged from the first tray 4 because the bundle discharge rollers 5 are being driven by the conveying motor M1. To prevent this, the bundle discharge rollers 5 are separated.

The bundle discharge rollers 5 have a construction such that the bundle discharge upper roller 5U and the bundle discharge lower roller 5L thereof are arranged in a staggered configuration. Therefore, when sheets are caused to be conveyed by the bundle discharge rollers 5, the sheets are straightly conveyed up to the lateral alignment members 6. For this reason, a first sheet alone is conveyed with the bundle discharge rollers 5 nipped.

Because the first sheet acts as a bridge between the bundle discharge rollers 5 and the lateral alignment members 6, second and later sheets can be smoothly conveyed up to the lateral alignment members 6 and loaded onto the first tray 4, even if the bundle discharge rollers 5 are separated.

If it is determined in step S815 that the descriptor 602 corresponds to "SOJ", or if the bundle discharge rollers 5 are separated in step S816, the processing waits a predetermined time to load sheets onto the first tray 4 (step S817). Then, setting for start of alignment processing for conducting alignment operation is performed (step S818), and the conveyance information 606 of a pertinent page in the conveyance management table 600 is set to "10B", thereby completing the staple conveyance processing (step S819).

In the jam processing in step S820, the conveyance information 606 of a pertinent page in the conveyance management table 600 is set to "11B", and a jam classification is set to an error information area (not shown), thereby completing the conveyance processing.

(4) Alignment Processing

Figure 9:
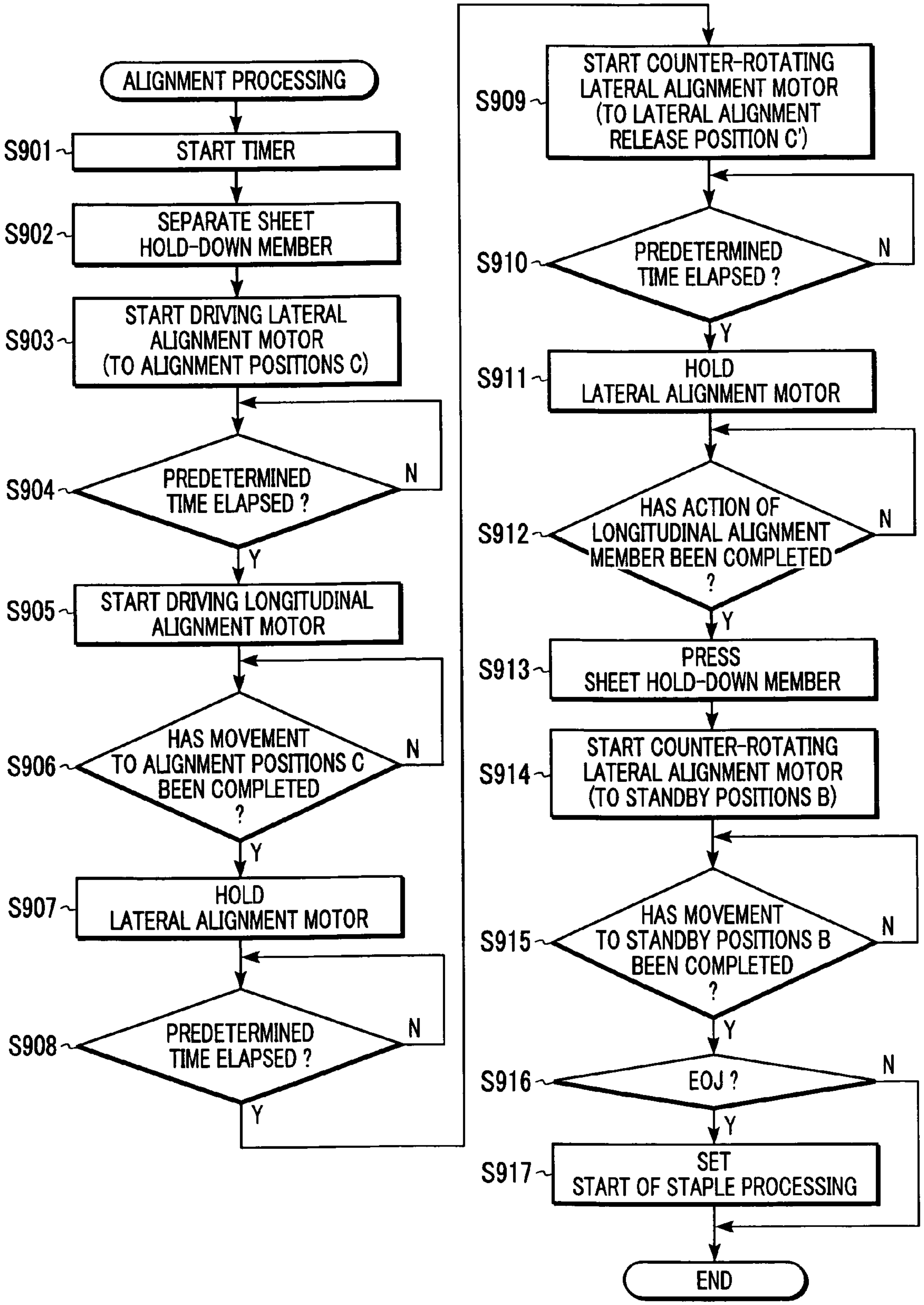
FIG. 9 is a flowchart showing alignment processing in the sheet processing apparatus.
Figure 10:
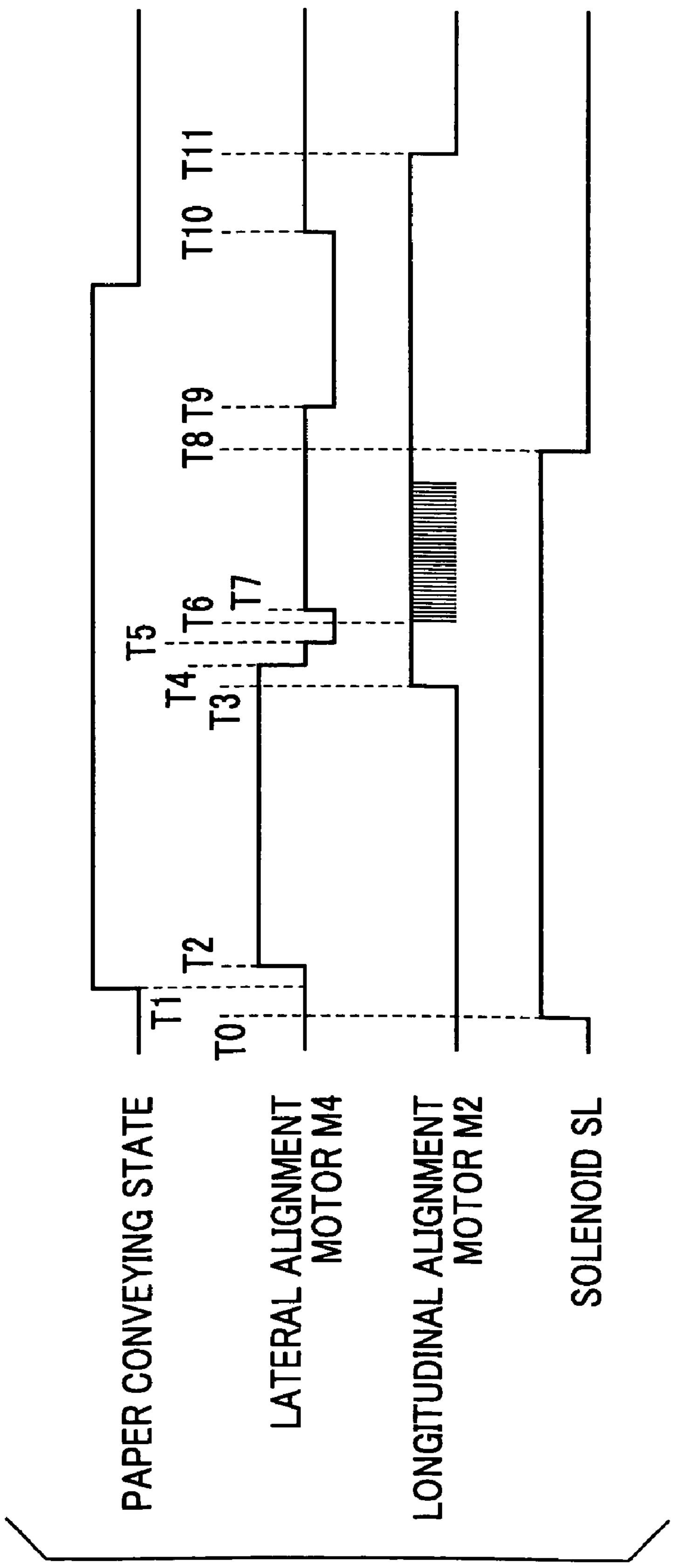
FIG. 10 is a timing chart in the alignment processing.

FIG. 9 is a flowchart showing alignment processing, and FIG. 10 is a timing chart in the alignment processing.

First, the timer is started (step S901), and the solenoid SL for separating the sheet hold-down member 9 is turned on in step S902 (T0 in FIG. 10). Immediately after this (T1 in FIG. 10), the sheet conveyance onto the first tray 4 is completed.

Then, the lateral alignment motor M4 is driven to move the lateral alignment members 6 up to the respective alignment positions C in step S903 (T2 in FIG. 10). The processing of step S903 is usually performed after the sheet hold-down member 9 has been completely separated, but the solenoid SL can be driven simultaneously with the lateral alignment members 6 without a problem. This is because the time period during which the separation of the sheet hold-down member 9 is completed, is sufficiently shorter than the time period during which the movement of the lateral alignment members 6 up to the respective alignment positions C is completed.

Should the sheet hold-down member 9 and sheets to be aligned mutually interfere, an adjustment might be made by providing a delay time between the processing of step S902 and that of step S903.

Next, the timer is checked, and the processing waits a predetermined time (step S904). Then, the longitudinal alignment motor M2 is driven to rotate the longitudinal alignment member 8 in step S905 (T3 in FIG. 10).

Thereafter, the processing waits a predetermined time for the lateral alignment members 6 to reach the respective alignment positions C (step S906), and holding of the lateral alignment motor M4 is performed in step S907 (T4 in FIG. 10). Here, "holding" of the lateral alignment motor M4 means that, when the lateral alignment motor M4 is a stepping motor, it is energized without performing a switching treatment of an excitation phase. The "holding" also includes that, in the energized state, voltage and current are reduced by a chopping drive, allowing for a temperature increase or power consumption in the motor.

Next, after the proceeding has further waited a predetermined time (step S908), the lateral alignment motor M4 is counter-rotated in step S909 (T5 in FIG. 10). Thereby, the lateral alignment member 6 moves to the position C' located slightly apart from the alignment position C (T6 in FIG. 10). Then, the proceeding waits a predetermined time (step S910), and holding of the lateral alignment motor M4 is performed in step S911 (T7 in FIG. 10).

At this point in time, the front end of the longitudinal alignment member 8 that is being rotated by the longitudinal alignment motor M2 makes contact with a sheet on the first tray 4, and thereby pulls back sheets that have straightly run off the first tray 4.

Specifically, after having separated the sheet hold-down member 9 from the sheet, alignment in the lateral direction is performed by the lateral alignment members 6, and at the time of the completion of the lateral alignment, a sequence of longitudinal alignment by the longitudinal alignment member 8 with the lateral alignment member 6 moved to the slightly opened position, is established. The reason why the lateral alignment members 6 are moved to the slightly opened position at the time of the longitudinal alignment by the longitudinal alignment member 8, is to prevent the sheet from becoming unable to be pulled back by a frictional force between the lateral alignment members 6 and the sheet.

Next, the proceeding waits a predetermined time for the longitudinal alignment member 8 to completely perform its action (step S912), and the solenoid for the sheet hold-down member is turned off to press the completely aligned sheet by the sheet hold-down member 9 in step S913 (T8 in FIG. 10). Because the aligned sheet bundle is kept pressed by the sheet hold-down member 9, a sheet at the uppermost position of the aligned sheet bundle can be prevented from being pushed out even if the next curled sheet is conveyed onto the first tray 4.

Thereafter, the lateral alignment motor M4 that has been held is counter-rotated in step S914 (T9 in FIG. 10), and the lateral alignment members 6 are returned to the respective standby positions (T10 in FIG. 10).

In this series of processing operations, one operation should be performed after another operation has been completed. However, in a high-speed printer, in which a sufficient time interval between paper sheets cannot be provided, the above-described series of processing must be performed in a short time. Accordingly, in the present invention, as in the processing of steps S902 and S903 and that of steps S905 and S909, the alignment processing was arranged to be completed in a minimum time, allowing for a sufficient operational time.

Then, the processing waits until the lateral alignment members 6 move up to the respective standby positions B (step S915), and waits until all alignment operations have been completed (T11 in FIG. 10).

With all alignment operations completed, the descriptor 602 in the page information 607 is referred to, and it is determined whether the page subjected to the alignment processing corresponds to "EOJ" (step S916). Otherwise, this alignment processing is completed. If the page corresponds to "EOJ", setting of the start of staple processing is made to perform staple processing (step S917), thereby completing this alignment operation.

While its description was omitted, the countermeasure against a motor failure detected in the initialization processing in (1) is taken in the above-described alignment operation, as well. When failure is detected, the drive of all actuators is stopped, thereby completing sheet conveyance processing.

(Staple Processing)

Figure 11:
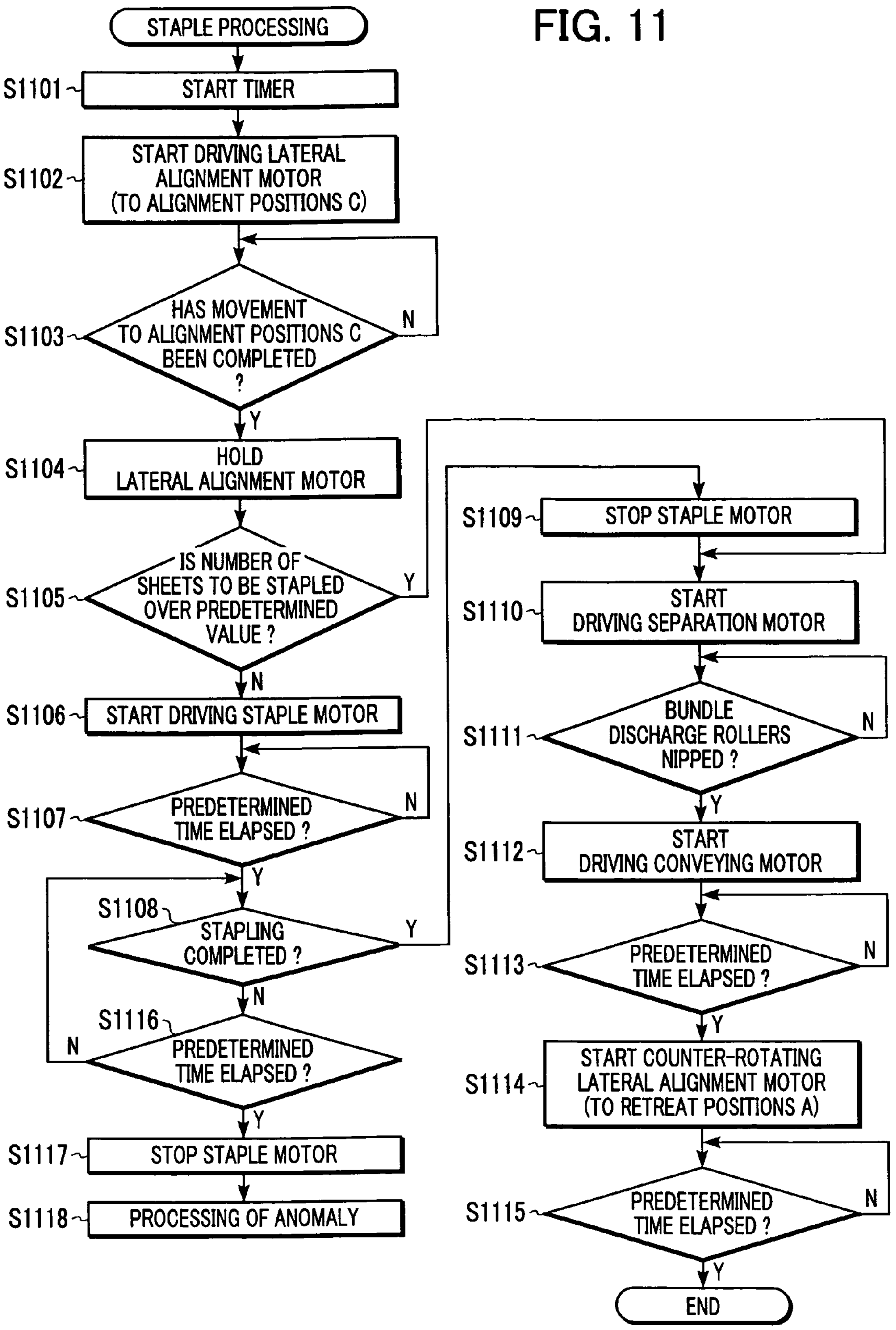
FIG. 11 is a flowchart showing staple processing in the sheet processing apparatus.

FIG. 11 is a flowchart showing staple processing. After having first performed the above-described staple conveyance processing and the alignment processing, the timer is started (step S1101). Then, the lateral alignment motor M4 is driven to move the lateral alignment members 6 up to the respective alignment positions C (step S1102). Next, the processing waits a predetermined time to complete the movement of the lateral alignment members 6 (step S1103), and the holding of the lateral alignment motor M4 is performed (step S1104).

Thereafter, the error information is referred to, and it is determined whether the number of sheets to be stapled is over a predetermined value (step S1105). If so, since no stapling is performed, the processing transfers to step S1110. Otherwise, the staple motor M5 is driven to staple a sheet bundle (step S1106).

Next, the proceeding waits a predetermined time (step S1107), and in order to determine whether the stapling has been completed, it is detected whether the stapler 15 is located in its home position, by the stapler HP sensor 16 (step S1108). If the stapling has not yet been completed, it is checked whether a predetermined time has been elapsed (step S1116). Otherwise, the processing returns to the processing of step S1108.

In step S1116, if it is determined that the predetermined time has been elapsed, the staple motor M5 is stopped (step S1117), and anomaly processing, such as the setting of a needle jam or a failure at the time of stapling, is performed (step S1118).

In step S1108, if it is determined that the stapling has been completed, the staple motor M5 is stopped (step S1109), and the separation motor M3 is driven upon determining that the stapling operation has been normally completed (step S1110). Then, the processing waits until the bundle discharge rollers 5 become nipped (step S1111), and the discharging of the stapled sheet bundle is started by starting the driving of the conveying motor M1 (step S1112).

Next, the proceeding waits a predetermined time (step S1113), and the lateral alignment motor M4 is counter-rotated to retreat the lateral alignment members 6 up to the respective retreat positions A (step S1114). This retreat operation of the lateral alignment members 6 causes the sheet bundle to lose the support of the lateral alignment members 6, and allows the sheet bundle to fall onto the second tray 7.

Thereafter, by being in a standby state for a predetermined time, the processing waits for the completion of bundle discharge and the completion of movement of the lateral alignment members 6 up to the respective retreat positions A (step S1115), thereby completing this flow.

In the present embodiment, the loading of sheet bundles to be loaded onto the second tray 7 can be switched between the loading in the alignability priority mode and that in the loading amount priority mode. In this respect, more detailed descriptions will be given below.

(6) Loading Processing

Figure 12A:
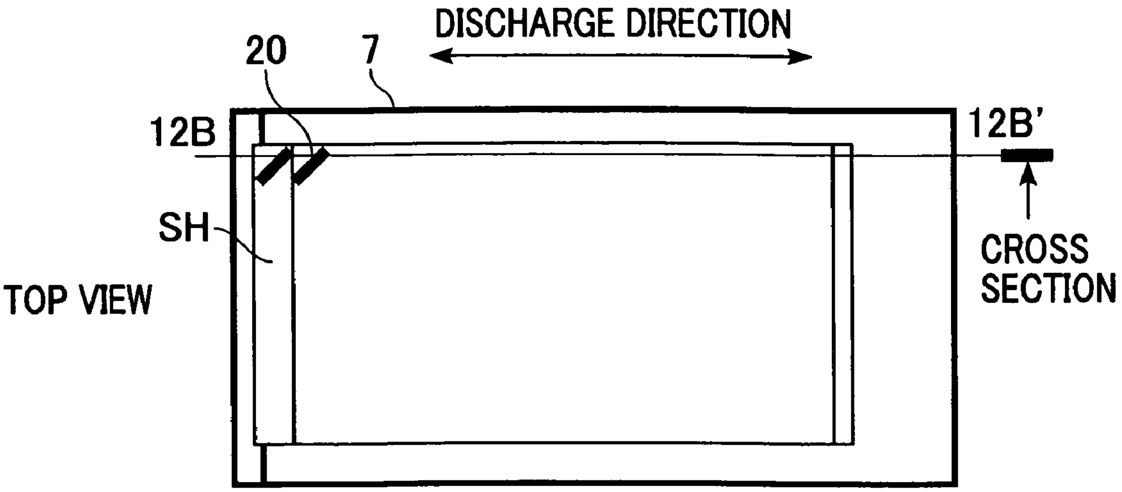
FIGS. 12A and 12B are views showing sheet bundles loaded in a loading amount priority mode.
Figure 12B:
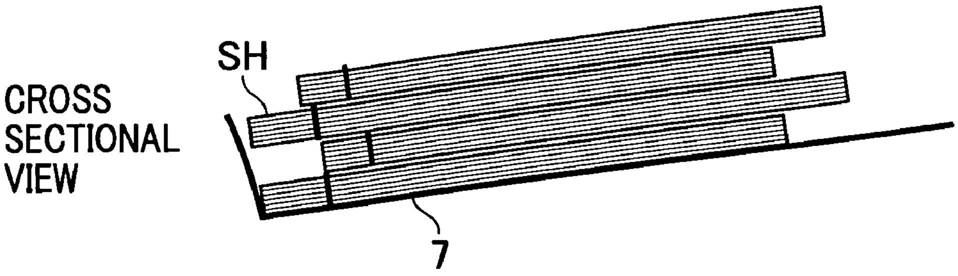

FIGS. 12A and 12B are views showing sheet bundles loaded in the loading amount priority mode. Here, FIG. 12A is a top view of the second tray 4, and FIG. 12B is a cross sectional view taken along the line 12B-12B' in FIG. 12A.

The sheet loading information 604 in FIG. 6, is set to data specifying the alignability priority, or data specifying the loading amount priority when sheets are to be loaded.

When the sheet loading information 604 is set to the alignability priority, the paper discharge is controlled so that sheets are loaded without changing the loading positions for each sheet bundle SH.

In contrast, when the sheet loading information 604 is set to the loading amount priority, the paper discharge is controlled so that sheets are loaded with the staple positions of stapled sheet bundles SH displaced from each other along the sheet discharge direction.

Specifically, by alternately repeating a high-speed discharge and low-speed discharge of sheet bundles SH, the loading positions of sheet bundles SH can be displaced from one another along the sheet conveying direction, as shown in FIG. 12B.

More specifically, in step S1112 in FIG. 11, when a paper discharge operation of the bundle discharge rollers 5 by the conveying motor M1 is performed at a high speed, the moving distance of a sheet bundle SH conveyed by the bundle discharge roller 5 becomes long, so that the sheet bundle SH falls onto a position spaced apart from the bundle discharge rollers 5 toward the sheet discharge direction. Conversely, when a paper discharge operation of the bundle discharge rollers 5 by the conveying motor M1 is performed at a low speed, the moving distance of the sheet bundle SH conveyed by the bundle discharge rollers 5 becomes short, so that the sheet bundle SH falls onto a position which is less spaced apart from the bundle discharge rollers 5 toward the sheet discharge direction. By alternately repeating these operations, a loading state as shown in FIGS. 12A and 12B can be achieved.

Shifting the retreat timing of the lateral alignment members 6 also allows the loading positions of sheet bundles SH to be displaced along the sheet conveying direction. Specifically, when the timing when the lateral alignment members 6 are retreated to the respective retreat positions A is made early, the moving distance of a sheet bundle SH conveyed by the bundle discharge rollers 5 becomes short, so that the sheet bundle SH falls onto a portion less spaced apart from the bundle discharge rollers 5 toward the sheet discharge direction. Conversely, when the timing when the lateral alignment members 6 are retreated to the respective retreat positions A is made late, the moving distance of the sheet bundle SH conveyed by the bundle discharge rollers 5 becomes long, so that the sheet bundle SH falls onto a position apart from the bundle discharge rollers 5 toward the sheet discharge direction. By alternately repeating these operations, a loading state as shown in FIGS. 12A and 12B can be implemented.

The combination of alternate changes in the paper discharge speed of a sheet bundle SH and alternate shifting of the retreat timing of the lateral alignment members 6 also allows a loading state as shown in FIGS. 12A and 12B to be realized.

Figure 13A:
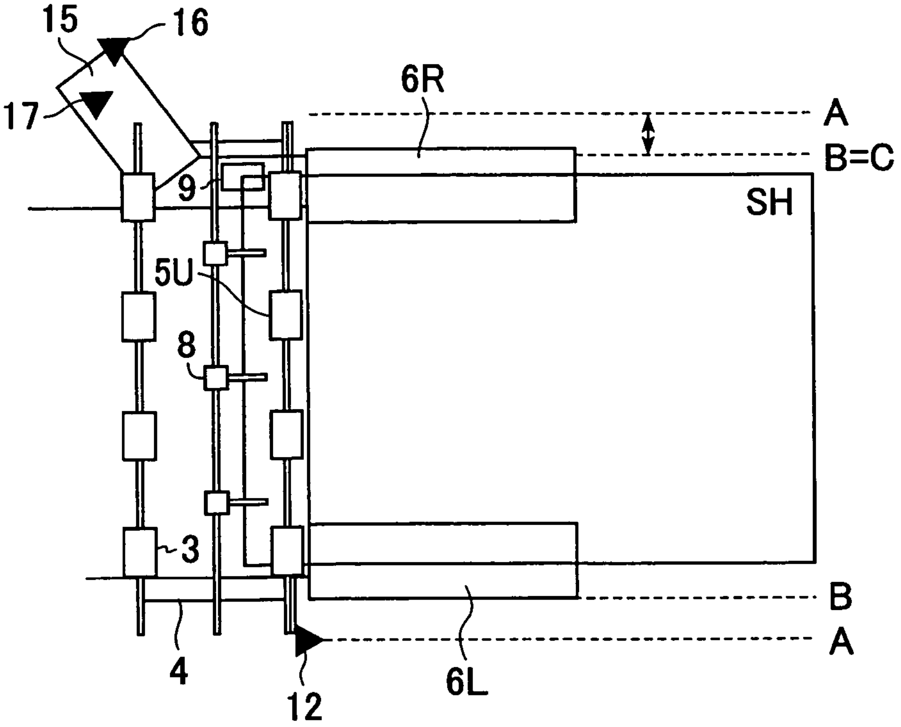
FIGS. 13A and 13B are top views of the alignment processing section when sheet bundles are being aligned.
Figure 13B:
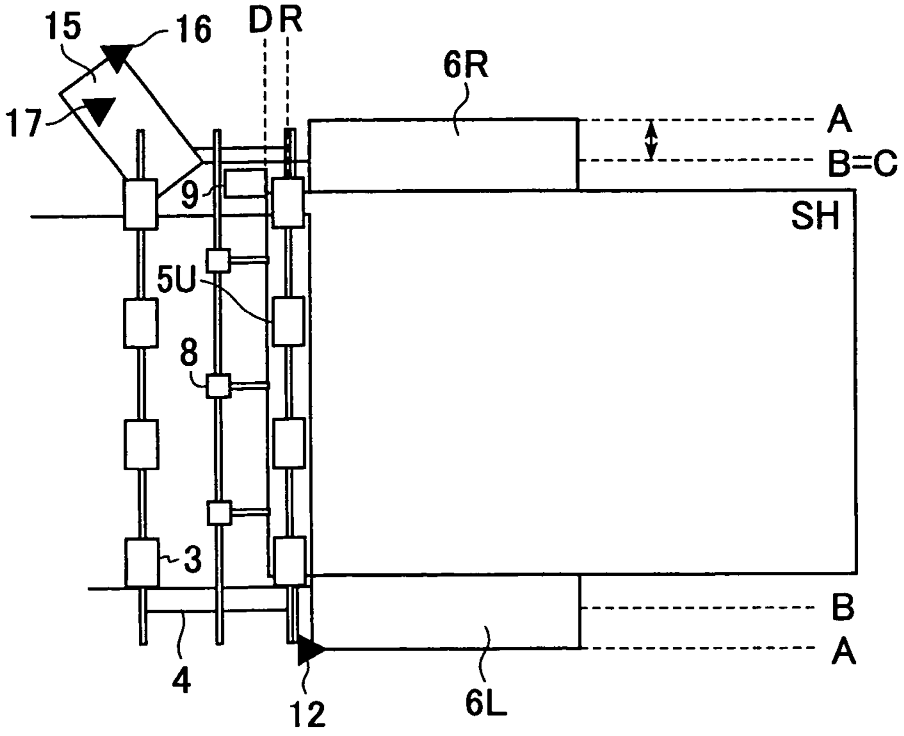
Figure 14A:
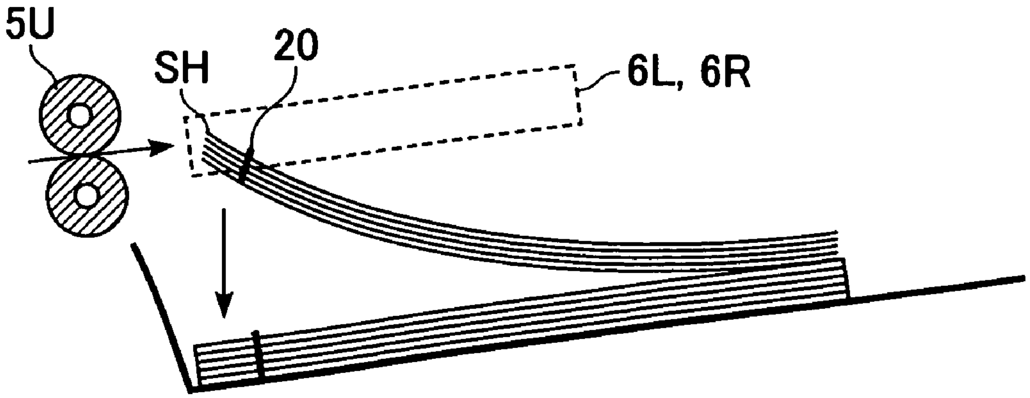
FIGS. 14A and 14B are views showing sheets loaded in an alignability priority mode.
Figure 14B:
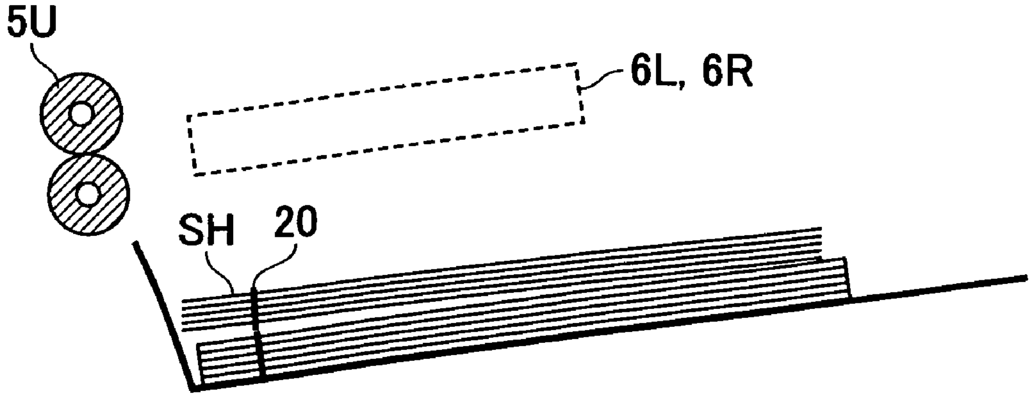

FIGS. 13A and 13B are top views of the alignment processing section when sheet bundles are being aligned. FIGS. 14A and 14B are views showing sheets loaded in the alignability priority mode.

FIG. 13A shows an appearance of a sheet bundle SH being moved toward the discharge direction by the rotation of the bundle discharge upper roller 5U. FIG. 13B shows a state where the lateral alignment members 6L and 6R have moved up to positions that are spaced from each other by at least the width of the sheet bundle SH, and the sheet bundle SH falls onto the second tray 7.

With regard to the relationship between the position D of the rear end of a sheet bundle SH, and the position R of the bundle discharge upper roller 5U, at the point in time when the position D is located at the rear of the position R with respect to the sheet discharge direction, drive control is performed such that the lateral alignment members 6L and 6R are spaced apart from each other by at least the width of the sheet bundle SH, whereby the sheet bundle SH falls.

As shown in FIG. 14A, the leading end of a sheet bundle SH fall onto the loaded sheet bundle, and the sheet bundles are ultimately loaded in the state shown in FIG. 14B. In this manner, when alignability priority is specified, loading is performed so that the positions of the stapling by staple needles 20 are superimposed on each other. By repeating the operations in FIGS. 13A and 13B, loading in the alignability priority mode is performed.

Figure 15A:
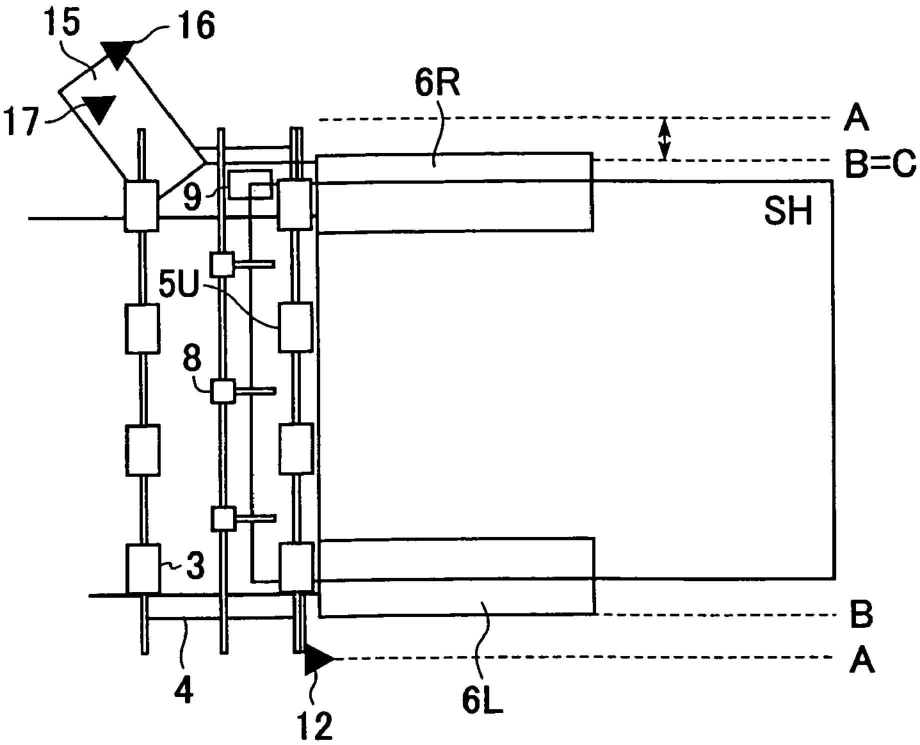
FIGS. 15A and 15B are top views of the alignment processing section when sheet bundles are being aligned.
Figure 15B:
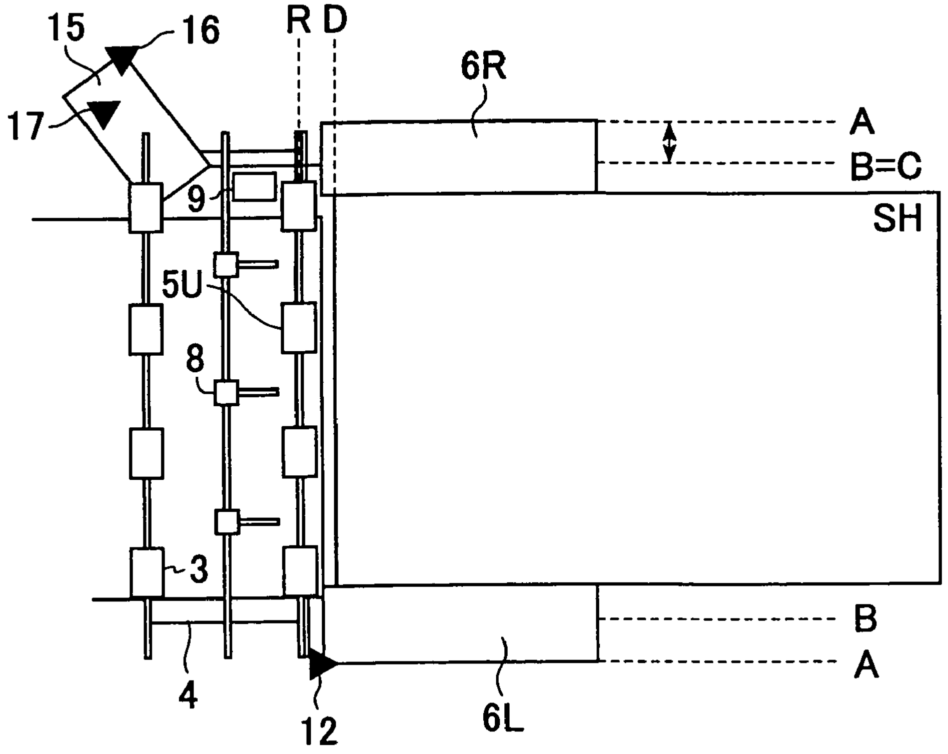
Figure 16A:
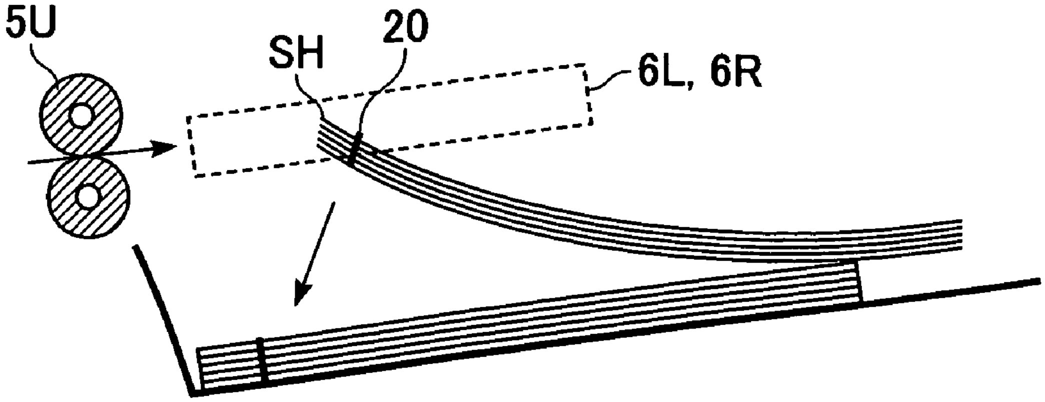
FIGS. 16A and 16B are views showing sheets loaded in the loading amount priority mode.
Figure 16B:
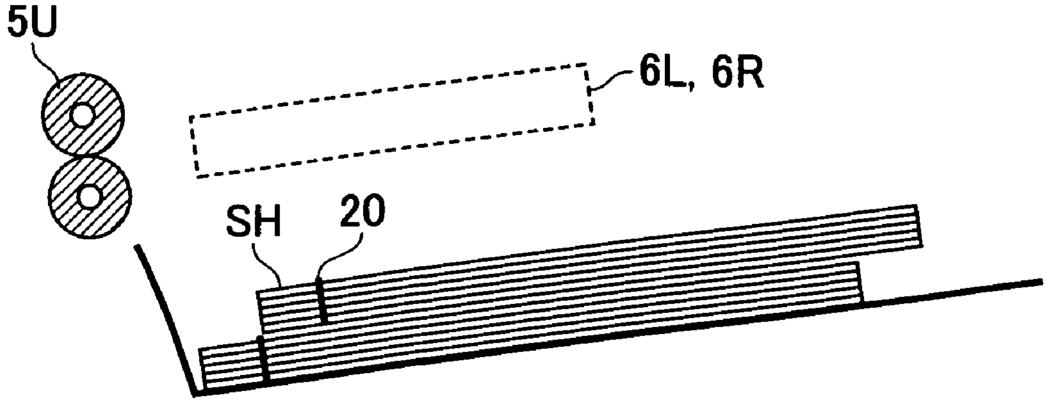

FIGS. 15A and 15B are top views of the alignment processing section when sheet bundles are being aligned. FIGS. 16A and 16B are views showing sheets loaded in the loading amount priority mode.

FIG. 15A shows an appearance of a sheet bundle SH being moved toward the discharge direction by the rotation of the bundle discharge upper roller 5U. FIG. 15B shows a state where the lateral alignment members 6L and 6R have moved up to positions that are spaced from each other by at least the width of the sheet bundle SH, and the sheet bundle SH falls onto the second tray 7.

With regard to the relationship between the position D of the rear end of a sheet bundle SH, and the position R of the bundle discharge upper roller 5U, at the point in time when the position D has moved to a position further toward the sheet discharge direction than the position R, drive control is performed such that the lateral alignment members 6L and 6R are spaced apart from each other by at least the width of the sheet bundle SH, whereby the sheet bundle SH falls.

As shown in FIG. 16A, the leading end of a sheet bundle SH fall onto the loaded sheet bundle, and the sheet bundles are ultimately loaded in the state shown in FIG. 16B. In this manner, when loading amount priority is specified, loading is performed so that the positions of the stapling by staple needles 20 are not superimposed on each other. By alternately repeating the operations in FIGS. 13A and 13B, and those in FIGS. 15A and 15B, loading in the loading amount priority mode is performed.

Figure 17A:
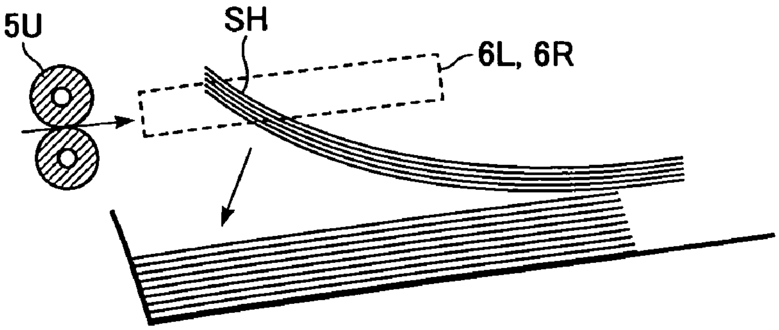
FIGS. 17A to 17C are views illustrating a case where sheet bundles discharged without stapling are loaded in a manner such that the loading positions thereof are displaced from each other along the sheet conveying direction.
Figure 17B:
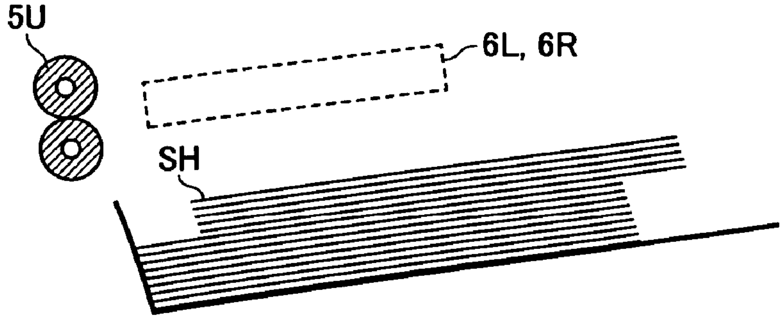
Figure 17C:
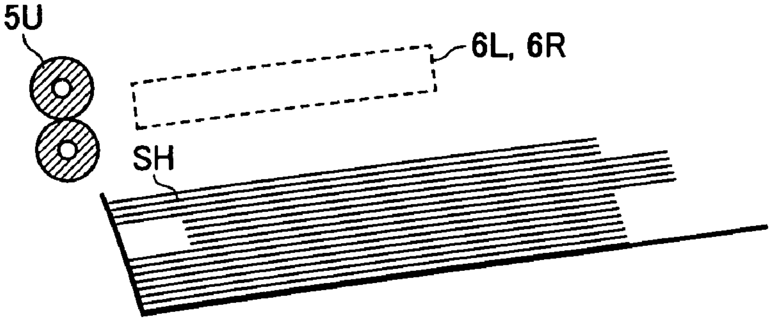
Figure 18A:
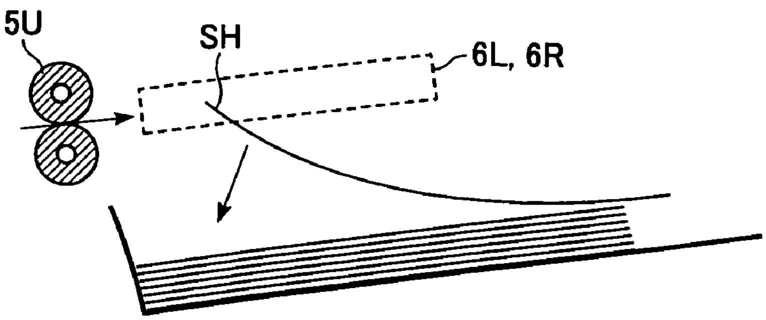
FIGS. 18A to 18C are views illustrating a case where sheets are loaded in a manner such that a sheet bundle without stapling and a sheet that are each discharged, are displaced from each other along the sheet conveying direction.
Figure 18B:
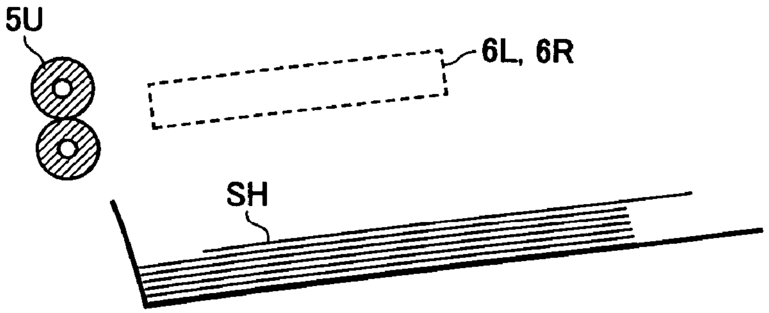
Figure 18C:
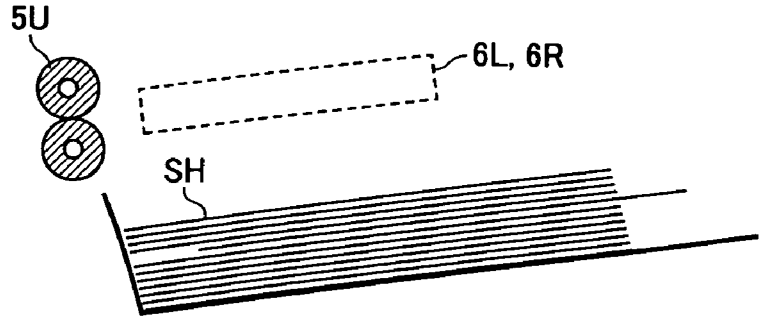
Figure 19A:
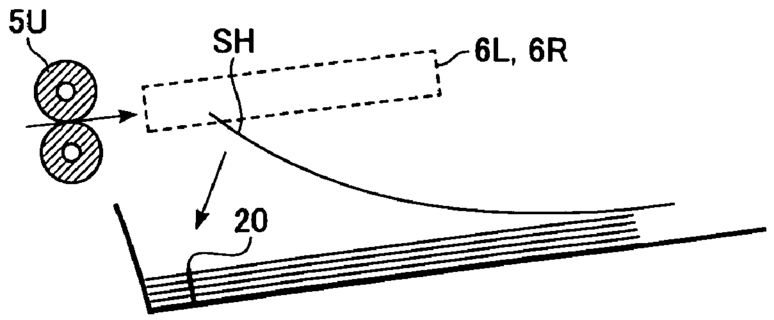
FIGS. 19A to 19C are views illustrating a case where sheets are loaded in a manner such that a stapled sheet bundle and a sheet that are each discharged, are displaced from each other along the sheet conveying direction.
Figure 19B:
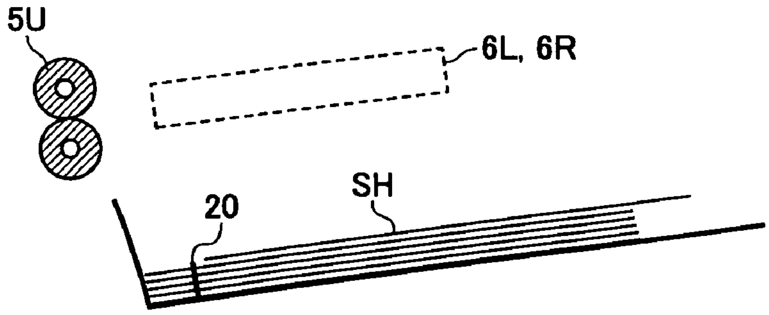
Figure 19C:
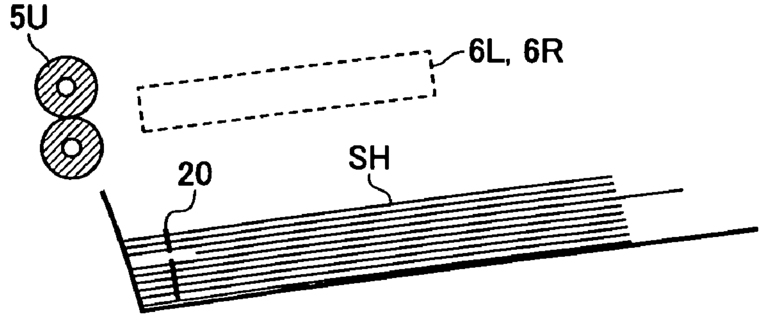

As shown in FIGS. 17A, 17B, and 17C, even when sheet bundles are discharged without stapling, loading of the sheet bundles can be performed with the loading positions thereof displaced from one another along the sheet discharge direction. Also, as shown in FIGS. 18A, 18B, and 18C, loading of sheet bundles can be performed by displacing a sheet bundle without stapling and a single sheet from each other along the sheet discharge direction. Furthermore, as shown in FIGS. 19A, 19B, and 19C, loading of sheet bundles can be performed by displacing a stapled sheet bundle and a single sheet from each other along the sheet discharge direction.

As described above, when the loading amount priority is selected, it is possible to prevent the occurrence of a protuberance at the sheet ends caused by staple processing, and avoid premature full load detection.

The sheet processing apparatus according to the present invention allows the loading of sheet bundles to be performed with the stapling positions thereof displaced from each other, and besides, enables sorting operations in various printing jobs to be implemented by varying falling positions of the sheet bundles.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A sheet processing apparatus, comprising:

sheet conveying means for conveying sheets;

first loading means for loading a sheet bundle comprising a plurality of sheets conveyed by the sheet conveying means;

first and second lateral aligning means for aligning the opposite side edges of the sheet bundle loaded on the first loading means in the direction perpendicular to the sheet conveying direction by moving between retreat positions out of contact with the sheet bundle and lateral aligning positions in contact with the sheet bundle;

stapling means for performing a stapling treatment with respect to a sheet bundle aligned by the first and second lateral aligning means;

sheet bundle conveying means for conveying a sheet bundle stapled by the stapling means;

second loading means for loading sheet bundles conveyed by the sheet bundle conveying means; and loading position control means for controlling a time at which the first and second lateral aligning means move from their aligning positions to their retreat positions for each sheet bundle, wherein, during loading of sheet bundles onto the second loading means, the first and second lateral aligning means move together to displace along the sheet conveying direction the loading positions of successive sheet bundles.

2. The sheet processing apparatus according to claim 1, wherein the second loading means is disposed below the first loading means.

3. The sheet processing apparatus according to claim 1, wherein the loading position control means displaces the loading positions of succeeding sheet bundles to be loaded onto the second loading means from each other along the sheet conveying direction, in order to prevent the stapling positions of the sheet bundles from being superimposed on each other.

4. The sheet processing apparatus according to claim 1, further comprising longitudinal alignment means for aligning a sheet bundle loaded on the first loading means in the sheet conveying direction.

5. The sheet processing apparatus according to claim 4, further comprising sheet hold-down means for holding down a sheet bundle loaded on the first loading means and aligned by the first and second lateral aligning means and the longitudinal alignment means.

6. The sheet processing apparatus according to claim 1, wherein the sheet conveying means and the sheet bundle conveying means are driven by a same driving source.

7. The sheet processing apparatus according to claim 6, wherein the sheet bundle conveying means is a pair of rollers comprising an upper roller and a lower roller, and wherein the sheet bundle conveying means can be switched between separation and nipping.

8. The sheet processing apparatus according to claim 7, wherein the upper roller and the lower roller are nipped when a first sheet is loaded onto the first loading means, and wherein the upper roller and the lower roller are separated when second and later sheets are loaded onto the first loading means.

9. The sheet processing apparatus according to claim 7, wherein the upper roller and the lower roller are arranged in a staggered configuration.

10. The sheet processing apparatus according to claim 1, further comprising full load detecting means for detecting the full load state of sheet bundles on the second loading means.

11. A sheet processing apparatus, comprising:

sheet conveying means for conveying sheets;

first loading means for loading a sheet bundle comprising a plurality of sheets conveyed by the sheet conveying means;

lateral aligning means for aligning opposite side edges of the sheet bundle loaded on the first loading means in a direction perpendicular to a sheet conveying direction;

stapling means for performing a stapling treatment with respect to a sheet bundle aligned by the lateral aligning means;

sheet bundle conveying means for conveying a sheet bundle stapled by the stapling means;

second loading means for loading sheet bundles conveyed by the sheet bundle conveying means; and loading position control means for controlling the speed of the sheet bundle conveying means, wherein, during loading of sheet bundles onto the second loading means, the speed of the sheet bundle conveying means controls displacements along the sheet conveying direction of the loading positions of successive sheet bundles.

* * * * *